May 24, 1932.  A. W. MILLER  1,860,111
AIR CLEANER
Filed May 4, 1929
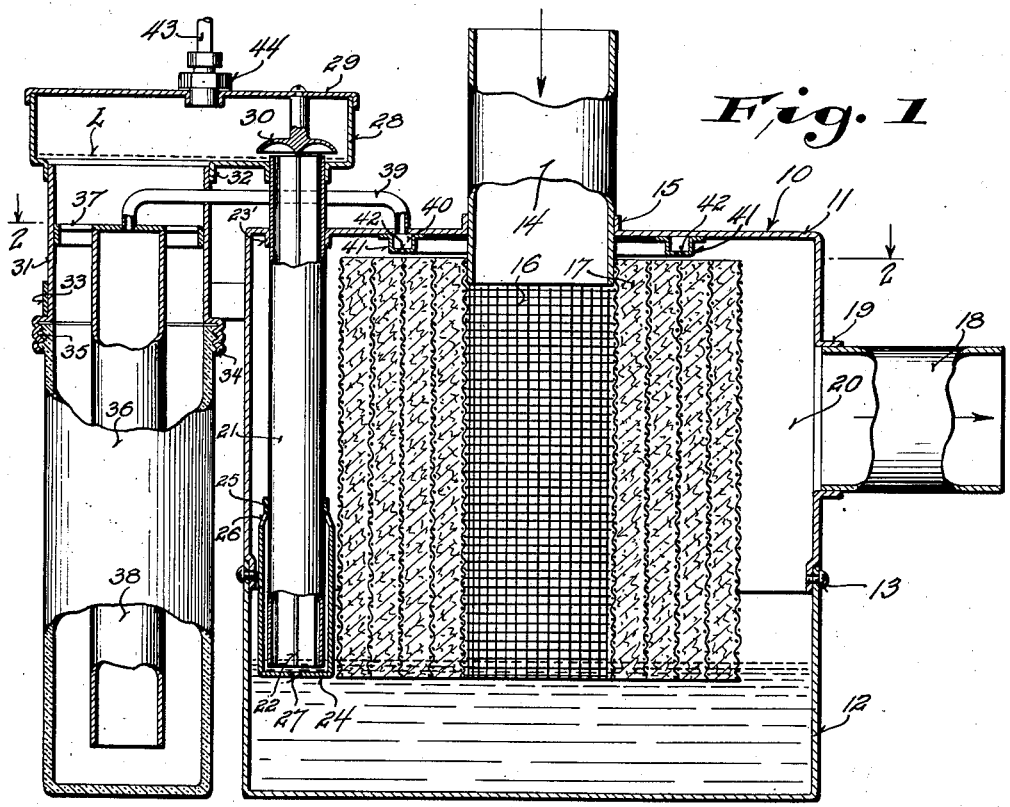
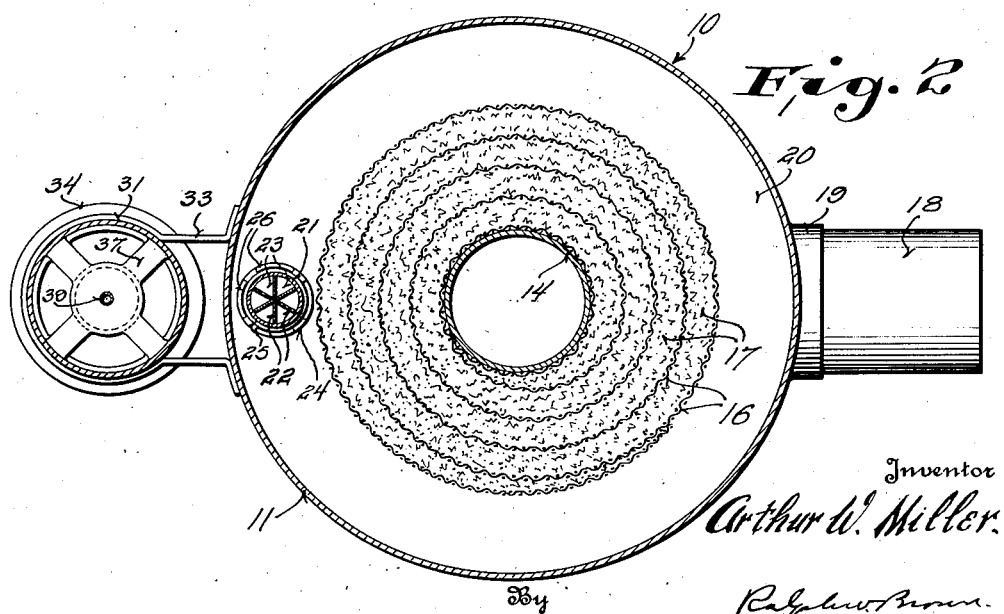
Inventor
Arthur W. Miller.
By
Ralph W. Brown.
Attorney Patented May 24, 1932

1,860,111

UNITED STATES PATENT OFFICE

ARTHUR W. MILLER, OF MILWAUKEE, WISCONSIN

AIR CLEANER

Application filed May 4, 1929. Serial No. 360,394.

This invention relates to air cleaners for use primarily in conjunction with internal combustion engines in automobiles, farm machinery, and the like.

The primary object of this invention is the provision of novel improved means for effectively freeing air of dust or foreign material prior to its admission into the carburetor of an internal combustion engine.

A more specific object is the provision of a novel combination of parts wherein the air to be directed into the carburetor is admitted into a housing and drawn thru an oil bearing pervious material to free the air from dust or other foreign matter.

Another object of this invention resides in the novel and improved means for constantly passing oil over the pervious material contained in the casing to thereby carry off the dust and foreign particles extracted from the air by that material.

A further object is the provision of a novel and improved air cleaner of such design that it contains no moving parts and hence readily adapts itself to manufacture at a comparatively low cost and which may be continuously operated indefinitely without wear.

Other objects and advantages will appear from the following description of an illustrative embodiment of the present invention.

In the drawings:

Figure 1 is a vertical longitudinal midsection through the air cleaner.

Figure 2 is a sectional view taken on the line 2—2 of Figure 1.

The air cleaner 10 selected for illustrative purposes in the accompanying drawings comprises a circular housing 11 provided with a removable bottom portion 12 which serves as an oil reservoir. The bottom portion 12 is adapted to be secured to the shell by means of screws 13. An air intake conduit in the form of a pipe 14 is directed through the center of the top of the housing 11 and permanently secured in any suitable manner to a flange 15 on the housing 11. A screen 16 of rather coarse mesh is attached to the lower end of the air intake pipe 14 to form in effect an extension thereof. A sheet of pervious material 17 such as steel wool or the like is then placed around the central portion of the screen. The screen 16 and steel wool 17 are then wrapped about the central portion of the screen in spiral convolutions and form what will be hereinafter referred to as a pervious core. The screen serves as a separator and retaining means between the several layers of the pervious material. An air outlet conduit in the form of a pipe 18 is secured at one end to a flange 19 on the casing 11. The other end of this pipe may be connected in any suitable manner to the intake manifold of a carburetor of an internal combustion engine (not shown). The bottom portion 12 of the shell contains a quantity of oil of a sufficient depth to immerse the bottom of the pervious core which consumes the greater portion of the space within the casing 11. A free air space 20 however surrounds the core of pervious material.

The system for constantly passing oil over and through the pervious core comprises a tube 21 provided with vertical partitions 22 to delineate a plurality of small ducts 23 which are continuous throughout the entire length of the tube. This tube extends from a position approximating the bottom of the pervious core through the top of the shell 11, and is secured in any suitable manner such as by soldering to an inwardly turned flange 23' formed on the housing 11. A cap 24 of slightly larger diameter than the tube 21 is applied to the lower end thereof by suitably retaining the neck 25 thereof on the tube. This cap is provided with a plurality of air inlet openings 26 adjacent the neck 25 thereof and an opening 27 in the bottom of the cap provides a passage through which oil is admitted from the base of the housing into the cap which encases the lower extremity of the tube 21. A suitable shell 28 is positioned upon the tube 21 slightly below the upper extremity thereof. A cap 29 is applied to the shell 28 to provide an air tight chamber. A deflector 30 which is positioned directly above the end of the tube 21 and in close proximity therewith is retained upon the cap 29 by means of a screw. A depending tubular shell 31 is permanently secured to a flange 32 on the shell 28. This shell 31 is also secured to the casing 11 of the cleaner by means of a suitable strap 33. The lower extremity 34 of this shell 31 is fashioned to receive and retain a screw threaded top 35 of a container 36, preferably formed of glass. A spider 37 anchored in any suitable manner within the tubular shell 31 forms a closure for the upper end of a tube 38, the lower open end of which lies adjacent the bottom of the container 36. A pipe 39, which passes through the wall of the tubular sleeve 31 serves as a communicating passage from the top of the tube 38 to an annular chamber 40 formed by the application of a flanged ring 41 to the inner wall of the top of the casing 11. A plurality of apertures 42 in the bottom face of the ring 41 serve as means through which oil may pass from the chamber 40 onto the pervious core formed of the screen 16 and the steel wool 17. One end of a suction pipe 43 is directed through the top 29 of the shell 28 through a suitable pipe fitting 44. The other end of this pipe communicates with the intake manifold of the engine in any suitable manner (not shown). The suction formed on the intake strokes of the pistons in the internal combustion engine serves as the means for raising oil from the base of the casing 11 to the shell 28 from which it may be discharged over the top of the pervious core in a manner and for a purpose about to be described.

The operation of the cleaner is extremely simple. When the internal combustion engine is running, the suction within the intake manifold of the engine is transmitted through the pipe 43 to the air tight shell 28. The action of this suction reduces the head of oil in the cap 24 and permits the entrance of air into the lower end of the tube 21. This air is drawn from the annular chamber 20 through the openings 26 in the cap 24. Upon the admission of air to the several ducts 23 within the tube 21 it mixes with the oil admitted through the opening 27 so as to aerate the oil and cause it to rise and discharge into the shell 28. After the engine has been operated for a short period of time, an oil level, as indicated by the line L, will be maintained in the shell 28 slightly below the top of the tube 21. This level will form a sufficient head of liquid to permit the free passage of oil through the tube 38 and pipe 39 to deliver the same to the annular chamber 40 and thence through the holes 42 to insure a constant flow of oil through the pervious core. It will readily be seen from the foregoing that as long as the engine is running oil will constantly be circulated from the base of the shell which forms an oil reservoir thru the mechanism just described and delivered to the top of the pervious core through which it will drain into the reservoir to again be circulated through the system. This circulation will terminate with the stopping of the engine and when the engine stops atmospheric pressure is again established in the shell 28 and the quantity of oil which has been maintained as a head therein will be discharged over the pervious core to flush and cleanse the same thoroughly.

The pervious core serves as a medium through which the air drawn into the carburetor permeates to cleanse itself of dust or other foreign matter in a manner about to be described. The suction formed in the intake manifold is transmitted from the carburetor through the pipe 18 to the inside of the shell 11. This suction will draw air through the pipe 14 and thence thru the pervious core. The size and shape of the shell which houses the core is such that the air drawn through the pipe 14 may spread radially through the core, and thence to the surrounding chamber 20 from which it is drawn through the pipe 18. This permitted radial flow together with the depth of the core makes it possible to effect a high volume of flow at low velocity within the core without requiring any material drop in pressure between the inlet pipe 14 and the annular chamber 20. As the air permeates through the interstices of the steel wool it is in constant contact with the oil which is draining thru the core. This contact of the air with the oil laden surfaces serves to effectively remove all dust particles and other foreign matter from the air prior to its admission to the carburetor. The dust particles which have been removed from the air will be washed down by the flow of oil through the core and gravitate to the bottom portion 12 of the housing 11. Thus the screen will be kept virtually free from any tendency to clog, and by virtue of the relatively large size of the core the same may remain in constant use for an indefinite period of time before cleaning or renewing of the core will be found necessary.

From the foregoing description it will readily be seen that a simple and effective air cleaner has been provided without the use of a single moving part which insures continuous operation without wear. The passage of air through the steel wool core which is subjected to a constantly changing bath of oil forms a simple and effective means for removing all dust particles and other foreign matter from the air to thus render it in a clean condition for use in the carburetor of an internal combustion engine.

While the device has been described in considerable detail, various changes may be made in the embodiment of the invention hereinabove specifically described without departing from or sacrificing any of the advantages of the invention as defined in the appended claims.

I claim:
1. In an air cleaner the combination of an oil retaining casing having air inlet and out- let conduits, a pervious core within said casing surrounding said inlet conduit to form in effect an extension thereof to permit a radial flow of air through said core, said casing having oil therein partially immersing said pervious core, means under the influence of suction for effecting a flow of oil over said core to free the same of foreign matter absorbed from the air in passing through the pervious core.

2. In an air cleaner the combination of an oil retaining casing having air inlet and outlet conduits, an oil reservoir communicating with said casing, a pervious core within said casing interposed between said air inlet and outlet conduits, said core forming in effect an extension of said air inlet conduit to permit the radial passage of air therethrough, suction actuated means for delivering oil from said casing to said reservoir and means for directing oil from said reservoir over said core to free the same of foreign matter removed from the air in passing through said core.

In witness whereof, I hereunto subscribe my name this 1st day of May, 1929.

ARTHUR W. MILLER.